US011696202B2

United States Patent
Han et al.

(10) Patent No.: US 11,696,202 B2
(45) Date of Patent: Jul. 4, 2023

(54) COMMUNICATION METHOD, BASE STATION, TERMINAL DEVICE, AND SYSTEM

(71) Applicant: HUAWEI TECHNOLOGIES CO., LTD., Guangdong (CN)

(72) Inventors: Feng Han, Shanghai (CN); Yinghao Jin, Shanghai (CN); Wei Tan, Shanghai (CN); Hong Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/786,532

(22) Filed: Feb. 10, 2020

(65) Prior Publication Data

US 2020/0178145 A1    Jun. 4, 2020

Related U.S. Application Data

(63) Continuation of application No. PCT/CN2018/099713, filed on Aug. 9, 2018.

(30) Foreign Application Priority Data

Aug. 11, 2017    (CN) .......................... 201710687720.3

(51) Int. Cl.
*H04W 36/30* (2009.01)
*H04W 28/02* (2009.01)
*H04W 36/00* (2009.01)

(52) U.S. Cl.
CPC ....... *H04W 36/30* (2013.01); *H04W 28/0268* (2013.01); *H04W 36/0072* (2013.01)

(58) Field of Classification Search
CPC . H04W 24/10; H04W 28/0268; H04W 28/24; H04W 36/00; H04W 36/0011;
(Continued)

(56) References Cited

U.S. PATENT DOCUMENTS 7,769,384 B2    8/2010    Lee et al.
9,161,183 B2    10/2015   Mun et al.
(Continued)

FOREIGN PATENT DOCUMENTS

CN    1930903 A    3/2007
CN    102131252 A    7/2011
(Continued)

OTHER PUBLICATIONS

Samsung, "Intra NG-RAN handover procedure", R3-171623, 3GPP TSG-RAN WG3 Meeting #96, May 15-19, 2017. (Year: 2017).*
(Continued)

*Primary Examiner* — Khoa Huynh
(74) *Attorney, Agent, or Firm* — Fish & Richardson P.C.

(57) ABSTRACT

Example communication methods and apparatus are described. One example method includes sending a handover request message to a target base station, where the handover request message is used to instruct to hand over a first session of a terminal device from the source base station to the target base station. The handover request message includes first information. The first information includes information about at least one quality of service (QoS) flow in the first session. The first session is a session corresponding to the terminal device. The source base station receives a handover request response message from the target base station, where the handover request response message includes second information. The second information is used to indicate that the target base station accepts a first QoS flow in the first session, and the at least one QoS flow includes the first QoS flow.

12 Claims, 5 Drawing Sheets

(58) Field of Classification Search
CPC ......... H04W 36/0022; H04W 36/0033; H04W 36/0044; H04W 36/0055; H04W 36/0072; H04W 36/08; H04W 36/30
See application file for complete search history.

(56) References Cited

U.S. PATENT DOCUMENTS

| | | | | |
|---|---|---|---|---|
| 2015/0126191 | A1* | 5/2015 | Yajima | H04W 36/0055 455/436 |
| 2018/0227816 | A1* | 8/2018 | Wu | H04W 76/10 |
| 2019/0191348 | A1* | 6/2019 | Futaki | H04W 36/0033 |
| 2019/0261240 | A1* | 8/2019 | Fang | H04W 28/0268 |
| 2019/0349803 | A1* | 11/2019 | Byun | H04W 28/0263 |
| 2020/0229023 | A1* | 7/2020 | Ke | H04W 72/087 |

FOREIGN PATENT DOCUMENTS

| | | | | |
|---|---|---|---|---|
| CN | 102316540 | A | 1/2012 | |
| CN | 106982410 | A | 7/2017 | |
| CN | 107302777 | A | 10/2017 | |
| WO | WO-2014000687 | A1 * | 1/2014 | ............ H04W 36/04 |
| WO | 2015020582 | A1 | 2/2015 | |
| WO | 2017121217 | | 7/2017 | |

OTHER PUBLICATIONS

Extended European Search Report issued in European Application No. 18843499.7 dated Jun. 30, 2020, 20 pages.
Huawei, "Intra-system, Intra-RAT mobility in RRC Connected," 3GPP TSG RAN WG3 Meeting #95bis, R3-171253, Spokane, USA, Apr. 3-7, 2017, 4 pages.
PCT International Search Report and Written Opinion issued in International Application No. PCT/CN2018/099713 dated Oct. 29, 2018, 15 pages (with English translation).
Samsung, "Intra NG-RAN handover procedure," 3GPP TSG RAN WG3 Meeting #96, R3-171623; Hangzhou, P.R. China, May 15-19, 2017, 6 pages.
Office Action issued in Chinese Application No. 201710687720.3 dated Mar. 3, 2021, 7 pages.
Office Action issued in Indian Application No. 202047009309 dated Aug. 12, 2021, 8 pages.
3GPP TS 38.423 V0.1.0 (May 2017), "3rd Generation Partnership Project; Technical Specification Group Radio Access Network; NG Radio Access Network (NG-RAN); Xn application protocol (XnAP) (Release 15)," May 2017, 53 pages.
3GPP TS 38.423 V0.3.0 (Aug. 2017), "3rd Generation Partnership Project; Technical Specification Group Radio Access Network;NG Radio Access Network (NG-RAN); Xn application protocol (XnAP) (Release 15)," Aug. 2017, 62 pages.
Huawei et al., "TS 23.502: Handling PDU sessions rejected by RAN during handover,"SA WG2 Meeting #121 S2-173138, Hangzhou, P. R. China, May 15-19, 2017, 9 pages, 10 pages.
Huawei, "Text Proposal for QoS flow based admission control in mobility," 3GPP TSG RAN WG3 Meeting #97, R3-173416, Berlin, Germany, Aug. 21-25, 2017, 10 pages.
Huawei, "Data forwarding with QoS flow relocation," 3GPP TSG RAN WG3 Meeting #95bis, R3-171072, Spokane, Washington, USA, Apr. 3-7, 2017, 6 pages.
Huawei et al., "QoS control for unstructured PDU sessions," 3GPP SA WG2 Meeting #122, S2-174690, San Jose Del Cabo, Mexico, Jun. 26-30, 2017, 7 pages.
ZTE, "Data forwarding for intra NG-RAN mobility," 3GPP TSG RAN WG3 Meeting #96, R3-171604, Hangzhou, P.R. China, May 15-19, 2017, 4 pages.

* cited by examiner

COMMUNICATION METHOD, BASE STATION, TERMINAL DEVICE, AND SYSTEM

CROSS-REFERENCE TO RELATED APPLICATIONS

This application is a continuation of International Application No. PCT/CN2018/099713, filed on Aug. 9, 2018, which claims priority to Chinese Patent Application No. 201710687720.3, filed on Aug. 11, 2017. The disclosures of the aforementioned applications are hereby incorporated by reference in their entireties.

TECHNICAL FIELD

This application relates to the field of communications, and more specifically, to a communication method, a base station, a terminal device, and a system.

BACKGROUND

With comprehensive and increasingly in-depth research on next-generation communications systems, a basic consensus on specific research content of 5G communications systems has been reached in the industry. 5G supports various types of network deployments and application types, including: an access capability with higher-rate experience and larger bandwidth, for example, enhanced mobile broadband (enhanced mobile broadband, eMBB); access and management of machine type devices with a larger scale and lower costs, for example, massive machine type communication (massive machine type communication, mMTC); information exchange with lower latency and higher reliability, for example, ultra-reliable and low latency communications (ultra reliable and low latency communication, URLLC); and the like. To meet the foregoing requirements, a quality of service (quality of service, QoS) flow (flow)-based framework is defined in 5G.

How to operate and manage communications networks based on a QoS flow-based framework is an urgent problem to be resolved in the industry.

SUMMARY

This application provides a communication method, a base station, a terminal device, and a system, to improve communication efficiency in a base station handover process.

According to a first aspect, a communication method is provided, including: sending, by a source base station, a handover request message to a target base station, where the handover request message is used to instruct to hand over a first session of a terminal device from the source base station to the target base station, the handover request message includes first information, the first information includes information about at least one quality of service QoS flow in the first session, and the first session is a session corresponding to the terminal device; and receiving, by the source base station, a handover request response message from the target base station, where the handover request response message includes second information, the second information is used to indicate that the target base station accepts a first QoS flow in the first session, and the at least one QoS flow includes the first QoS flow.

In this embodiment of this application, in an inter-base station handover scenario, the handover request response message carries the second information to indicate that the target base station accepts the first QoS flow in the first session, so that the source base station may perform a QoS flow granularity handover process based on content of the second information, thereby improving management efficiency and communication efficiency in a base station handover process.

In a possible implementation, the method further includes: receiving, by the source base station, third information from the target base station, where the third information is used to indicate that the target base station rejects a second QoS flow in the first session, and the at least one QoS flow includes the second QoS flow.

In a possible implementation, the method further includes: receiving, by the source base station, fourth information from the target base station, where the fourth information is used to indicate a reason why the second QoS flow is rejected.

In a possible implementation, the reason why the second QoS flow is rejected includes at least one of the following: no resource is available, QoS flow information is not supported, QoS flow information is invalid, and QoS flow information is invalid.

In a possible implementation, the method further includes: sending, by the source base station, fifth information to the terminal device, where the fifth information is used to indicate that the target base station accepts the first QoS flow in the first session.

In a possible implementation, the fifth information is carried in a first radio resource control RRC message, and the first RRC message is used to instruct the terminal device to hand over from the source base station to the target base station.

In a possible implementation, the method further includes: receiving, by the source base station, sixth information from the target base station, where the sixth information is used to indicate a mapping relationship between the first QoS flow and a second bearer of the first session, and the second bearer is a bearer between the terminal device and the target base station; and sending, by the source base station, the sixth information to the terminal device.

In a possible implementation, the method further includes: sending, by the source base station, first data to the target base station, where the first data is data that is received by the source base station from a core network and that corresponds to the first QoS flow in the first session.

In a possible implementation, the sending, by the source base station, first data to the target base station includes: sending, by the source base station, the first data to the target base station through a session tunnel.

In a possible implementation, the method further includes: sending, by the source base station, first PDCP SDUs to the target base station, where the first packet data convergence protocol (Packet Data Convergence Protocol, PDCP) service data units (service data unit, SDU) include PDCP SDUs of a first bearer of the first session, and the first bearer is a bearer between the terminal device and the source base station; and sending, by the source base station, seventh information to the target base station, where the seventh information is used to indicate that the first PDCP SDUs belong to an accepted QoS flow and/or a rejected QoS flow.

In a possible implementation, the method further includes: sending, by the source base station, second PDCP SDUs to the target base station, where the second PDCP SDUs include PDCP SDUs that are sent by the source base station to the terminal device by using the first bearer of the first session and that are not acknowledged, and the second PDCP SDUs correspond to the first QoS flow in the first bearer.

In a possible implementation, the method further includes: sending, by the source base station, eighth information to the terminal device, where the eighth information is used to indicate serial numbers of the second PDCP SDUs.

According to a second aspect, a communication method is provided, including: receiving, by a target base station, a handover request message from a source base station, where the handover request message is used to instruct to hand over a terminal device from the source base station to the target base station, the handover request message includes first information, the first information includes information about at least one quality of service QoS flow in a first session, and the first session is a session corresponding to the terminal device; and sending, by the target base station, a handover request response message to the source base station, where the handover request response message includes second information, the second information is used to indicate that the target base station accepts a first QoS flow in the first session, and the at least one QoS flow includes the first QoS flow.

In this embodiment of this application, in an inter-base station handover scenario, the handover request response message carries the second information to indicate that the target base station accepts the first QoS flow in the first session, so that the source base station may perform a QoS flow granularity handover process based on content of the second information, thereby improving management efficiency and communication efficiency in a base station handover process.

In a possible implementation, the method further includes: sending, by the target base station, third information to the source base station, where the third information is used to indicate that the target base station rejects a second QoS flow in the first session, and the at least one QoS flow includes the second QoS flow.

In a possible implementation, the method further includes: sending, by the target base station, fourth information to the source base station, where the fourth information is used to indicate a reason why the second QoS flow is rejected.

In a possible implementation, the reason why the second QoS flow is rejected includes at least one of the following: no resource is available, QoS flow information is not supported, QoS flow information is invalid, and QoS flow information is invalid.

In a possible implementation, the method further includes: sending, by the target base station, sixth information to the source base station, where the sixth information is used to indicate a mapping relationship between the first QoS flow and a second bearer of the first session, and the second bearer is a bearer between the terminal device and the target base station.

In a possible implementation, the method further includes: receiving, by the target base station, first data from the source base station, where the first data is data that is received by the source base station from a core network and that corresponds to the first QoS flow in the first session.

In a possible implementation, the receiving, by the target base station, first data from the source base station includes: receiving, by the target base station, the first data from the source base station through a session tunnel.

In a possible implementation, the method further includes: receiving, by the target base station, first PDCP SDUs from the source base station, where the first PDCP SDUs are PDCP SDUs of a first bearer of the first session, and the first bearer is a bearer between the terminal device and the source base station; and receiving, by the target base station, seventh information from the source base station, where the seventh information is used to indicate that the first PDCP SDUs belong to an accepted QoS flow and/or a rejected QoS flow.

In a possible implementation, the method further includes: determining, by the target base station, third PDCP SDUs based on the seventh information, where the third PDCP SDUs are PDCP SDUs that are in the first PDCP SDUs and that correspond to a transferred QoS flow; and transmitting, by the target base station, the third PDCP SDUs to an upper layer, and/or sending, by the target base station, the third PDCP SDUs to the terminal device.

In a possible implementation, the method further includes: receiving, by the target base station, second PDCP SDUs from the source base station, where the second PDCP SDUs include PDCP SDUs that are sent by the source base station to the terminal device by using the first bearer of the first session and that are not acknowledged, and the second PDCP SDUs correspond to the first QoS flow in the first bearer, and sending, by the target base station, the second PDCP SDUs to the terminal device.

In a possible implementation, the method further includes: receiving, by the target base station, fourth PDCP SDUs from the terminal device, where the fourth PDCP SDUs include PDCP SDUs that are sent by the terminal device to the source base station by using the first bearer of the first session and that have not been acknowledged, and the fourth PDCP SDUs correspond to the first QoS flow in the first bearer.

In a possible implementation, the method further includes: receiving, by the target base station, ninth information from the terminal device, where the ninth information is used to indicate serial numbers of the fourth PDCP SDUs; and transmitting, by the target base station, the fourth PDCP SDUs to the upper layer based on the ninth information.

According to a third aspect, a communication method is provided, including: receiving, by a terminal device, a first radio resource control RRC message from a source base station, where the first RRC message is used to instruct the terminal device to hand over from the source base station to a target base station, the first RRC message includes fifth information, and the fifth information is used to indicate that the target base station accepts a first QoS flow in a first session; and sending, by the terminal device, a first RRC response message to the target base station, where the first RRC response message is used to respond to the first RRC message.

In this embodiment of this application, the terminal device transfers a received QoS flow service based on an admission control result indicated by the fifth information, and maps the QoS flow service to a bearer determined by the target base station, so that transfer of a rejected data packet is avoided, thereby implementing efficient and reliable inter-cell handover.

In a possible implementation, the method further includes: receiving, by the terminal device, sixth information from the source base station, where the sixth information is used to indicate a mapping relationship between the first QoS flow and a second bearer of the first session, and the second bearer is a bearer between the terminal device and the target base station.

In a possible implementation, the method further includes: receiving, by the terminal device, second PDCP SDUs from the target base station, where the second PDCP SDUs include PDCP SDUs that are sent by the source base station to the terminal device by using a first bearer of the first session and that are not acknowledged, and the second PDCP SDUs correspond to the first QoS flow in the first bearer.

In a possible implementation, the method further includes: receiving, by the terminal device, eighth information from the source base station, where the eighth information is used to indicate serial numbers of the second PDCP SDUs.

In a possible implementation, the method further includes: transmitting, by the terminal device, the second PDCP SDUs to an upper layer based on the eighth information.

In a possible implementation, the method further includes: sending, by the terminal device, fourth PDCP SDUs to the target base station, where the fourth PDCP SDUs include PDCP SDUs that are sent by the terminal device to the source base station by using the first bearer of the first session and that have not been acknowledged, and the fourth PDCP SDUs correspond to the first QoS flow in the first bearer.

In a possible implementation, the method further includes: sending, by the terminal device, ninth information to the target base station, where the ninth information is used to indicate serial numbers of the fourth PDCP SDUs.

According to a fourth aspect, a base station is provided. The base station is configured to perform the method in the first aspect or any possible implementation of the first aspect. Specifically, the base station includes modules configured to perform the method in the first aspect or any possible implementation of the first aspect.

According to a fifth aspect, a base station is provided. The base station is configured to perform the method in the second aspect or any possible implementation of the second aspect. Specifically, the base station includes modules configured to perform the method in the second aspect or any possible implementation of the second aspect.

According to a sixth aspect, a terminal device is provided. The terminal device is configured to perform the method in the third aspect or any possible implementation of the third aspect. Specifically, the base station includes modules configured to perform the method in the third aspect or any possible implementation of the third aspect.

According to a seventh aspect, a communications system is provided. The communications system includes the base station described in the fourth aspect and the fifth aspect and the terminal device described in the sixth aspect.

According to an eighth aspect, a base station is provided. The base station includes a communications interface, a memory, a processor, and a bus system, where the communications interface, the memory, and the processor are connected to each other by using the bus system, the memory is configured to store instructions, the processor is configured to perform the instructions stored in the memory, to control the communications interface to receive signals and/or send signals, and when the processor executes the instructions stored in the memory, the processor performs the method in the first aspect or any possible implementation of the first aspect.

According to a ninth aspect, a base station is provided. The base station includes a communications interface, a memory, a processor, and a bus system, where the communications interface, the memory, and the processor are connected to each other by using the bus system, the memory is configured to store instructions, the processor is configured to perform the instructions stored in the memory, to control the communications interface to receive signals and/or send signals, and when the processor executes the instructions stored in the memory, the processor performs the method in the second aspect or any possible implementation of the second aspect.

According to a tenth aspect, a terminal device is provided. The terminal device includes a communications interface, a memory, a processor, and a bus system, where the communications interface, the memory, and the processor are connected to each other by using the bus system, the memory is configured to store instructions, the processor is configured to perform the instructions stored in the memory, to control the communications interface to receive signals and/or send signals, and when the processor executes the instructions stored in the memory, the processor performs the method in the third aspect or any possible implementation of the third aspect.

According to an eleventh aspect, a communication method is provided. The communications system includes the base station described in the eighth aspect and the ninth aspect and the terminal device described in the tenth aspect.

According to a twelfth aspect, a computer readable medium is provided, and is configured to store a computer program, where the computer program includes instructions used to perform the method in the first aspect or any possible implementation of the first aspect.

According to a thirteenth aspect, a computer readable medium is provided, and is configured to store a computer program, where the computer program includes instructions used to perform the method in the second aspect or any possible implementation of the second aspect.

According to a fourteenth aspect, a computer readable medium is provided, and is configured to store a computer program, where the computer program includes instructions used to perform the method in the third aspect or any possible implementation of the third aspect.

DESCRIPTION OF EMBODIMENTS

Figure 1:
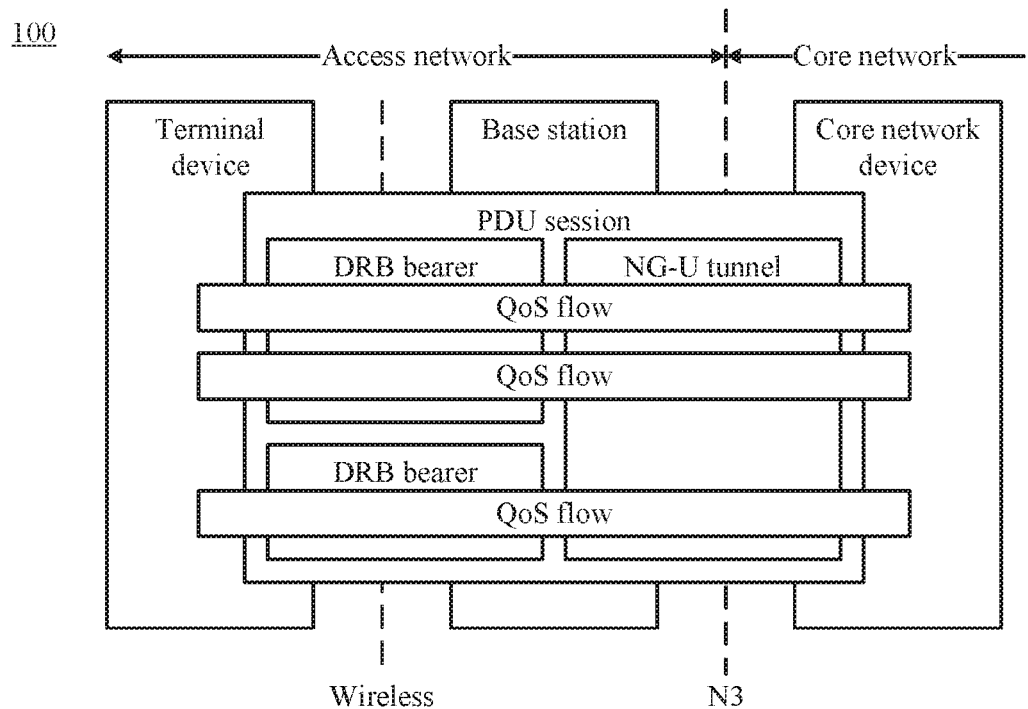
FIG. 1 is a schematic diagram of a network architecture according to an embodiment of this application.

The following describes technical solutions of this application with reference to accompanying drawings.

The technical solutions of the embodiments of this application may be applied to various communications systems, such as: a global system for mobile communications (Global System of Mobile Communication, GSM) system, a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, an LTE frequency division duplex (Frequency Division Duplex, FDD) system, an LTE time division duplex (Time Division Duplex, TDD) system, a universal mobile telecommunications system (Universal Mobile Telecommunication System, UMTS), a worldwide interoperability for microwave access (Worldwide Interoperability for Microwave Access, WiMAX) communications system, a future 5th generation (5th Generation, 5G) system, or a new radio (New Radio, NR).

A terminal device in the embodiments of this application may also be referred to as user equipment, an access terminal, a subscriber unit, a subscriber station, a mobile station, a mobile console, a remote station, a remote terminal, a mobile device, a user terminal, a terminal, a wireless communications device, a user agent, a user apparatus, or the like. The terminal device may be a cellular phone, a cordless phone, a session initiation protocol (Session Initiation Protocol. SIP) phone, a wireless local loop (Wireless Local Loop, WLL) station, a personal digital assistant (Personal Digital Assistant, PDA), a handheld device having a wireless communication function, a computing device, another processing device connected to a wireless modem, a vehicle-mounted device, a wearable device, a terminal device in a future 5G network, or a terminal device in a future evolved public land mobile network (Public Land Mobile Network, PLMN). This is not limited in the embodiments of this application.

A base station in the embodiments of this application may be a device configured to communicate with the terminal device. The base station may be a base transceiver station (Base Transceiver Station, BTS) in a global system for mobile communications (Global System of Mobile communication, GSM) system or a code division multiple access (Code Division Multiple Access, CDMA) system, or may be a NodeB (NodeB, NB) in a wideband code division multiple access (Wideband Code Division Multiple Access, WCDMA) system, or may be an evolved NodeB (Evolutional NodeB, eNB or eNodeB) in an LTE system, or may be a radio controller in a cloud radio access network (Cloud Radio Access Network, CRAN), or the like. This is not limited in the embodiments of this application.

As mentioned above, 5G supports various types of network deployments and application types. To meet the foregoing requirements, a quality of service (quality of service, QoS) flow (flow)-based framework is defined in 5G. The framework can support a guaranteed flow bit rate QoS flow or a non-guaranteed flow bit rate QoS flow.

A QoS flow architecture used in the embodiments of this application is briefly described below.

FIG. 1 is a schematic diagram of a possible network architecture 100 according to an embodiment of this application. The network architecture 100 is a possible implementation form of a QoS flow architecture. As shown in FIG. 1, one terminal device may establish one or more sessions with a core network (core network, CN). A base station may map data packets that belong to different sessions to different bearers, and map packets that belong to a same session to one or more bearers. A QoS flow is the finest granularity of QoS differentiation in the foregoing sessions. Optionally, a corresponding QoS flow identifier (QoS flow identifier, QFI) may be assigned to each QoS flow, and one QFI may be used to indicate one QoS flow. Services with a same QFI in a same session accept a same scheduling policy or same admission control. When a data packet is transmitted through a communications interface between the core network and the base station, a QFI may be carried in an encapsulation header of the data packet. As shown in FIG. 1, the communications interface between the core network and the base station may be an N3 interface. Alternatively, the communications interface between the core network and the base station may be referred to as a next-generation user plane (Next-generation user plane, NG-U) tunnel.

It should be noted that the session may be a packet data unit (packet data unit, PDU) session, and the bearer may be a data resource bearer (data resource bearer, DRB). The PDU session may be a connection established between the terminal device and a data network. The connection may be used to provide a PDU connection service. A type of the connection may be Internet Protocol (internet protocol, IP), Ethernet or another type. In some embodiments, a method or an apparatus of this application is described by using an example in which the session is a PDU session and the bearer is a DRB. In addition, the core network may include a core network device. The core network device may include, for example, a user plane function (user plane function, UPF) entity, an access and mobility management function (Access and Mobility Management function, AMF), and a session management function (Session Management function, SMF).

A data packet processing mechanism over an air interface is defined based on a DRB in 5G. Data packets that are served by one DRB have a same packet processing mechanism in transmission over an air interface. A plurality of DRBs may be established between the base station and the terminal device to meet different packet processing requirements of QoS flows. It should be noted that one DRB may have a mapping relationship with one QoS flow or may have mapping relationships with a plurality of QoS flows. Specifically, for downlink data transmission (down load, DL), the base station may map a downlink data packet corresponding to a QoS flow to a corresponding DRB based on a QFI identifier and a QoS profile (profile) corresponding to the QFI, and perform downlink transmission. Correspondingly, for uplink data transmission (up load, UL), the terminal device maps an uplink data packet corresponding to a QoS flow to a corresponding DRB based on a mapping relationship that is between the QoS flow and the DRB and that is configured by the base station, and performs uplink transmission.

For ease of understanding, the following describes QoS flow parameters. In this embodiment of this application, the QoS flow parameter may alternatively be referred to as QoS flow configuration parameter.

Specifically, each QoS flow includes at least the following parameters:

a 5G QoS identifier (5G QoS Identifier, 5QI) and an allocation and retention priority (an allocation and retention priority, ARP) parameter. For example, the ARP parameter may include at least one of the following information:

a priority level (priority level) parameter, used to determine whether the QoS flow can be accepted or can be rejected when resources are limited, where in a typical scenario, the priority level parameter may be applied to a guaranteed flow bit rate (guaranteed flow bit rate, GBR) QoS flow;

a preemption capability (the pre-emption capability) parameter, used to determine whether the QoS flow can preempt a resource of another QoS flow with a low priority; and a preemption vulnerability (the pre-emption vulnerability) parameter, used to determine whether a resource of the QoS flow can be preempted by another QoS flow with a high priority.

In this embodiment of this application, the network architecture 100 may schedule or manage data transmission based on a QoS flow-based framework. Alternatively, the network architecture 100 may perform QoS flow granularity admission control management. The admission control management may be admission control, for a handover process, performed by a target base station. For example, in the solution of the embodiments of this application, the admission control may be determining, by the target base station, whether to accept a QoS flow requested by a source base station for handover. When resources are abundant, the newly added QoS flow does not affect normal transmission of another QoS flow. When resources are limited, whether transmission of a service mapped to the newly added QoS flow can be accepted is determined based on the allocation and retention priority parameter.

After a QoS flow-based architecture is introduced to a communications system, how to efficiently manage or schedule data transmission in a QoS flow granularity architecture is an urgent problem to be resolved in the industry. In view of this, this embodiment of this application mainly focuses on how to manage a QoS flow granularity base station handover process.

Figure 2:
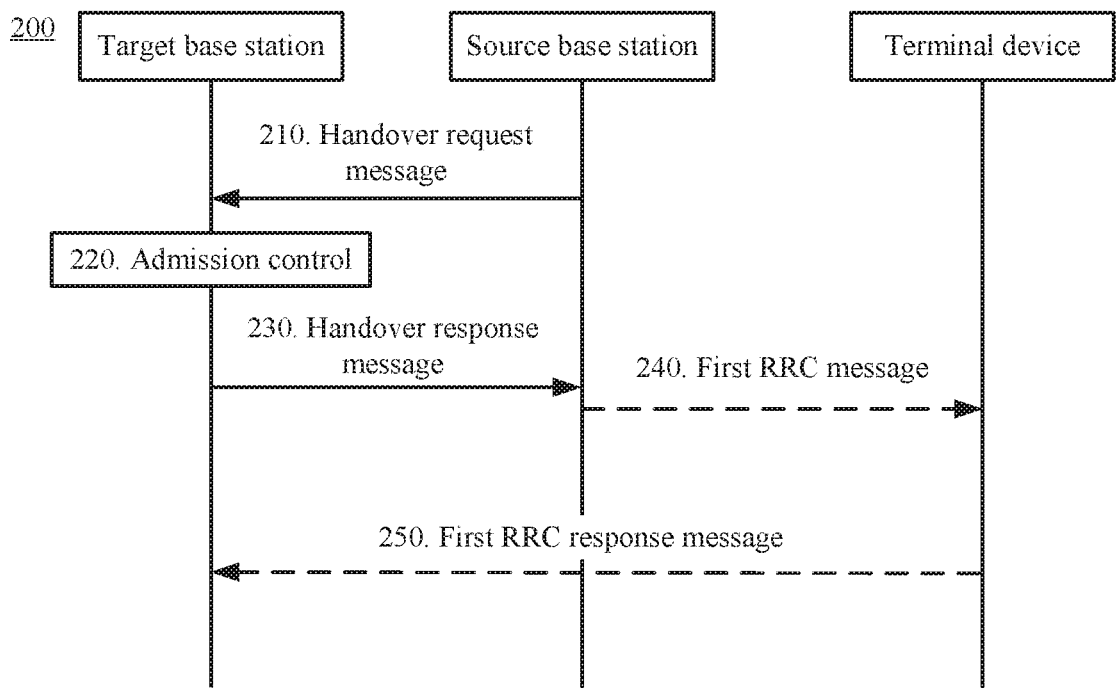
FIG. 2 is a schematic diagram of a communication method according to an embodiment of this application.

FIG. 2 is a schematic diagram of a communication method 200 according to an embodiment of this application. The method in FIG. 2 may be applied to the network architecture 100 in FIG. 1. As shown in FIG. 2, the method 200 may include steps 210 to 230. The following describes the steps in FIG. 2 in detail.

In step 210, a source base station sends a handover request message to a target base station, and correspondingly, the target base station receives the handover request message from the source base station, where the handover request message is used to instruct to hand over a terminal device from the source base station to the target base station, the handover request message includes first information, the first information includes information about at least one QoS flow in a first session, and the first session is a session corresponding to the terminal device.

The handing over a terminal device from the source base station to the target base station may be: handing over a session corresponding to the terminal device from the source base station to the target base station.

It should be understood that the first session may be a session established between the terminal device and a core network. The first session may be initiated or established by the terminal device or may be initiated and established by the core network. This is not limited in this embodiment of this application. For example, the session may be a PDU session. The PDU session may be a connection established between the terminal device and a data network. The connection may be used to provide a PDU connection service. A type of the connection may be Internet Protocol (internet protocol, IP), Ethernet or another type.

It should be further understood that at least one session may be established between the terminal device and the core network. Each of the at least one session may correspond to at least one bearer. The bearer may be a bearer established between the terminal device and a base station. For example, before the terminal device is handed over from the source base station to the target base station, the bearer may be a bearer between the terminal device and the source base station. After the terminal device is handed over from the source base station to the target base station, the bearer may be a bearer between the terminal device and the target base station. Each of the at least one bearer may have a mapping relationship with at least one QoS flow. In other words, data packets corresponding to one or more QoS flows may be transmitted on a same bearer. In an example, the bearer may be a DRB.

It should be noted that the information about the at least one QoS flow in the first session may be information about all QoS flows or some QoS flows in the first session. Specifically, the information about the at least one QoS flow may include a mapping relationship between the at least one QoS flow and a bearer and/or between the at least one QoS flow and a parameter of the at least one QoS flow. In a specific example, the first information may indicate one or more bearers included in the first session and a QoS flow included in each of the one or more bearers. Alternatively, the first information may indicate a parameter of a QoS flow in the first session and a bearer to which the QoS flow is mapped.

For example, Table 1 shows a possible implementation form of the first information when the first session is a PDU session (session) and the bearer is a DRB.

TABLE 1

PDU session list (PDU sessions list)
>PDU session identifier (PDU Session ID)
>QoS flow list (QoS flow list)
>>>>QFI
>>>>QoS flow parameter
>RRC context information A format of the first information is not limited in this embodiment of this application. For example, the first information may be an information element (information element, IE) or may be an indicator. As shown in Table 1, the first information may include an identifier of a PDU session corresponding to the terminal device and a list of QoS flows included in the PDU session. The list of QoS flows may be represented by a QFI. In addition, the first information may further include a QoS flow parameter and RRC context information.

For example, Table 2 shows content included in the QoS flow parameter. As shown in Table 2, the QoS flow parameter includes at least one of the following: a 5QI, an allocation and contention priority (Allocation and Retention Priority), GBR QoS flow information, and notification control (Notification Control).

TABLE 2

5QI
Allocation and contention priority (Allocation and Retention Priority)
GBR QoS flow information
Notification control (Notification Control)

For example, Table 3 shows content included in the RRC context information. As shown in Table 3, the RRC context information includes a DRB configuration parameter and a mapping relationship between a QoS flow and a DRB.

TABLE 3

>Session ID (session ID)
>DRB identifier list (DRB ID list)
>>DRB identifier (DRB ID)
>>>QoS flow list (QoS flow list)
>>>PHY, MAC, RLC, PDCP, SDAP configurations of a DRB Optionally, in step 210, the source base station adds the information about the at least one QoS flow in the first session to the handover request message, so that the target base station performs admission control based on the first information.

Optionally, in step 220, the target base station performs admission control based on the first information.

The admission control may be admission control, for a handover process, performed by the target base station. For example, in the solution in this embodiment of this application, the admission control may be determining, by the target base station, whether to accept a QoS flow requested by a source base station for handover. When resources are abundant, the newly added QoS flow does not affect normal transmission of another QoS flow. When resources are limited, whether transmission of a service mapped to the newly added QoS flow can be accepted is determined based on the allocation and retention priority parameter.

For example, the admission control may be determining, by the target base station based on a current network status and another reference factor, whether to receive some or all QoS flows in the first session. In other words, based on information that is about at least one QoS flow and that is included in the first information, the target base station may determine to receive all or some QoS flows in the first session or determine to reject all or some QoS flows in the first session. For example, the admission control may be performed based on an ARP parameter that is of at least one QoS flow and that is included in the first information. For example, when resources are limited, some or all QoS flows may be rejected based on an ARP of the QoS flows, and a reason why a QoS flow is rejected is sent to the source base station. For a specific process in which the target base station performs the admission control based on the first information, refer to description of step 230.

Optionally, before step 210, the terminal device may perform cell measurement, and send a cell measurement report to the source base station. The source base station may determine, based on the cell measurement report, to send the handover request message to the target base station.

In step 230, the source base station receives a handover request response message from the target base station, where the handover request response message includes second information, the second information is used to indicate that the target base station accepts a first QoS flow in the first session, and the at least one QoS flow includes the first QoS flow.

Specifically, after receiving the handover request message, the target base station may determine, based on the first information included in the handover request message, to receive all or some QoS flows in the first session. For example, the target base station may perform admission control based on a QoS flow parameter and a current load. The QoS flow parameter may include, for example, the ARP parameter.

Further, the target base station may send the handover request response message to the source base station based on a result of the admission control, and add the second information to the handover request response message to indicate that the target base station accepts the first QoS flow in the first session. The first QoS flow may be some or all of the at least one QoS flow.

In this embodiment of this application, in an inter-base station handover scenario, the handover request response message carries the second information to indicate that the target base station accepts the first QoS flow in the first session, so that the source base station may perform a QoS flow granularity handover process based on content of the second information, thereby improving management efficiency and communication efficiency in a base station handover process.

Optionally, the second information may indicate, in an explicit manner and/or an implicit manner, the first QoS flow accepted by the target base station. In the explicit manner, the second information may include an identifier of the first QoS flow. For example, the identifier of the first QoS flow may be a QFI. The source base station may determine, based on QFIs included in the second information, which QoS flows in the first session are accepted and which QoS flows in the first session are rejected. Alternatively, in the implicit manner, the second information may include an identifier of a rejected QoS flow in the first session. For example, the second information may include a QFI of the rejected QoS flow. The source base station may exclude the rejected QoS flow from the QoS flows in the first session based on the QFI included in the second information, thereby determining an accepted first QoS flow.

In a specific example, Table 4 shows a possible implementation of the second information. A format of the second information is not limited in this embodiment of this application. The second information may be an IE or may be an indicator. As shown in Table 4, the second information may include an identifier of a PDU session and a list of accepted QoS flows in the PDU session. Specifically, the list of the QoS flows may include QFIs of the QoS flows.

TABLE 4

List of admitted PDU sessions (PDU sessions admitted list)
>PDU session identifier (PDU Session ID)
>List of accepted QoS flows (accepted QoS flow list)
>>QFI Further, in some embodiments, the source base station may receive third information from the target base station, where the third information is used to indicate that the target base station rejects a second QoS flow in the first session. The at least one QoS flow includes the second QoS flow.

In a specific example, Table 5 shows an implementation form of the second information and/or the third information. Specifically, Table 3 may be a possible implementation in which the second information includes both explicit information and implicit information. Alternatively, Table 5 may be a possible implementation in which the handover request response message includes both the second information and the third information. The format of the second information or a format of the third information is not limited in this embodiment of this application. The second information or the third information may be an IE or may be an indicator.

As shown in Table 5, the second information and/or the third information may include an identifier of an admitted PDU session, a list of accepted QoS flows in the PDU session, and a list of rejected QoS flows in the PDU session. Specifically, the list of the QoS flows may include QFIs of the QoS flows.

TABLE 5

List of admitted PDU sessions (PDU sessions admitted list)
>PDU session identifier (PDU session ID)
>List of accepted QoS flows (accepted QoS flow list)
>>QFI
>List of rejected QoS flows (rejected QoS flow list)
>>QFI Optionally, when all QoS flows in one PDU session are rejected, it indicates that the entire PDU session is rejected. For example, Table 6 shows a possible implementation form of the second information or the third information when the entire PDU session is rejected. Specifically, Table 4 shows a possible implementation in which the second information is implicit, or, Table 6 shows a possible implementation form of the third information. As shown in Table 6, the second information or the third information may include a list of rejected PDU sessions. The list of the rejected PDU sessions may be represented by identifiers of the PDU sessions.

TABLE 6

List of rejected PDU sessions (PDU sessions not admitted list)
>PDU session identifier (PDU session ID)

Specifically, the following cases may occur when the terminal device hands over from the source base station to the target base station. In a first case, all QoS flows in the first session are rejected by the target base station, or all QoS flows in the first session are accepted, that is, the entire first session is rejected or admitted by the target base station. In a second case, all QoS flows on a same bearer of the first session are rejected by the target base station, or all QoS flows on a same bearer of the first session are accepted by the target base station. In a third case, some QoS flows on a same bearer of the first session are rejected by the target base station, or some QoS flows on a same bearer of the first session are accepted by the target base station.

Furthermore, the source base station may receive fourth information from the target base station, where the fourth information is used to indicate a reason why the second QoS flow is rejected.

For example, both the third information and the fourth information may be carried in the handover response message in step 230. Alternatively, the third information and the fourth information may be sent separately from the handover response message.

For example, the reason why the second QoS flow is rejected includes at least one of the following: no resource is available (no resource available), QoS flow information is not supported (Not supported), QoS flow information is invalid (invalid QoS parameter), and a QFI is not supported (not supported QFI). "no resource is available" may be that no air interface resource of the target base station is available. "QoS flow information is not supported" may be that the target base station does not support a rejected QoS flow. "QoS flow information is invalid" may be that the target base station cannot recognize information about the rejected QoS flow. "A QFI is not supported" may be that the target base station does not support the QFI. Alternatively, the reason why the second QoS flow is rejected may further include other factors, which are not enumerated in this embodiment of this application.

In this embodiment of this application, a QoS flow granularity transmission control manner is provided in a base station handover scenario, so that finer-grained quality of service management can be implemented in a base station handover process, thereby improving communication efficiency.

Optionally, the method 200 further includes step 240 and step 250.

In step 240, the terminal device receives a first radio resource control (radio resource control, RRC) message from the source base station, where the first RRC message is used to instruct the terminal device to hand over from the source base station to the target base station, the first RRC message includes fifth information, and the fifth information is used to indicate that the target base station accepts the first QoS flow in the first session.

In some embodiments, instead of being carried in the first RRC message, the fifth information may be sent separately from the first RRC message.

In this embodiment of this application, the terminal device transfers a received QoS flow service based on an admission control result indicated by the fifth information, and maps the QoS flow service to a bearer determined by the target base station, so that transfer of a rejected data packet is avoided, thereby implementing efficient and reliable intercell handover.

In some embodiments, the first RRC message may be an RRC connection reconfiguration (RRC connection reconfiguration) message.

In some embodiments, the first RRC message may include instruction information. The instruction information is used to instruct the terminal device to establish a second bearer of the first session between the terminal device and the target base station, to transmit data between the terminal device and the target base station. QoS flows carried (carry) in the second bearer include the first QoS flow.

In a possible solution, the method 200 further includes: receiving, by the source base station, sixth information from the target base station, where the sixth information is used to indicate a mapping relationship between the first QoS flow and a second bearer of the first session, and the second bearer is a bearer between the terminal device and the target base station. After obtaining the sixth information, the source base station may send the sixth information to the terminal device.

It should be understood that there is no connection established between the target base station and the terminal device in a handover process, and therefore, the source base station practically transmits the sixth information transparently. In other words, the sixth information is actually information sent by the target base station to the terminal device. For example, the target base station may send the sixth information to the source base station by using a transparent container (transparent container), and then the source base station forwards the sixth information to the terminal device.

Further, after receiving the sixth information, the terminal device may establish the second bearer between the terminal device and the target base station based on the sixth information.

For example, when the source base station receives the sixth information from the target base station, the sixth information may be carried in the handover request response message in S230.

For example, the sixth information may be sent in the form of a list of accepted QoS.

For example, when the target base station forwards the sixth information to the terminal device, the sixth information may be carried in the first RRC message in S240.

In a specific example, when the first session is a PDU session (session) and the bearer is a DRB, Table 7 shows a possible implementation form of the sixth information. A format of the sixth information is not limited in this embodiment of this application. For example, the sixth information may be an information element (information element, IE) or may be an indicator. As shown in Table 7, the sixth information may include an identifier of a PDU session, and a list of identifiers of DRBs included in the PDU session. Further, the sixth information includes a list of QoS flows included in each DRB. The list of QoS flows may be represented by a QFI. In addition, the sixth information may further include a DRB configuration parameter. The DRB configuration parameter includes at least one of the following: a physical (physical, PHY) layer configuration parameter, a media access medium (Media Access Control, MAC) layer configuration parameter, a radio link (Radio Link Control, RLC) layer configuration parameter, a PDCP layer configuration parameter, and an SDAP layer configuration parameter.

TABLE 7

PDU session list
>PDU session identifier (PDU Session ID)
>DRB identifier list (DRB ID list)
>>DRB identifier (DRB ID)
>>>QoS flow list (QoS flow list)
>>>>QFI
>>PHY, MAC, RLC, PDCP, SDAP configurations of a DRB In step 250, the target base station receives a first RRC response message from the terminal device, where the first RRC response message is used to respond to the first RRC message.

In some embodiments, when the first RRC message is an RRC connection reconfiguration (RRC connection reconfiguration) message, the first RRC message may be an RRC connection reconfiguration response (RRC connection reconfiguration response) message.

In some embodiments, when the first RRC message includes instruction information instructing to establish the second bearer between the terminal device and the target base station, the terminal device may establish the second bearer with the target base station, and send the first RRC response message to the target base station after the second bearer is established.

In some embodiments, if the terminal device fails to establish the second bearer with the target base station, the terminal device may send the first RRC response message to the target base station, and the first RRC response message carries a reason why a bearer fails to be established.

In this embodiment of this application, the terminal device receives the first RRC message sent by the source base station, the fifth information included in the first RRC message is used to indicate that the target base station accepts the first QoS flow in the first session, so that the terminal device may perform a QoS flow granularity handover procedure based on the indication of the fifth information, thereby improving communication efficiency in a base station handover process.

The foregoing mainly describes a signaling procedure in the base station handover process. A data forwarding (data forwarding) process during base station handover is described next. In the base station handover process, there will be a large quantity of unacknowledged data packets on the side of the source base station or the terminal device. Alternatively, the source base station buffers data that is received from the core network and that has not been sent to the terminal device. Therefore, how to ensure lossless handover in a handover scenario is an important issue that needs to be resolved in the industry.

The foregoing data packet may include a packet data convergence protocol (packet data convergence protocol, PDCP) service data unit (service data unit, SDU). The PDCP SDU may be a data packet transmitted between a base station and the terminal device in a PDCP layer. The PDCP layer is a sublayer in a data link layer (data link) in a radio access protocol system structure. The data link layer may also be referred to as Layer 2. A lower-layer sub-protocol of the PDCP layer includes a radio link control (radio link control) layer. An upper-layer protocol of the PDCP layer is an RRC layer. Optionally, in this embodiment of this application, a new protocol layer is added between the PDCP layer and the RRC layer. The protocol layer is service data adaptation protocol (Service Data Adaptation Protocol, SDAP). The functions of the SDAP layer include, but are not limited to, a function of processing mapping from a QoS flow to a DRB and a function of adding a QoS flow ID to a packet header of a data packet.

It is mentioned in step 230 that, the following cases may occur when the terminal device hands over from the source base station to the target base station. In a first case, all QoS flows in the first session are rejected by the target base station, or all QoS flows in the first session are accepted, that is, the entire first session is rejected or admitted by the target base station. In a second case, all QoS flows on a same bearer of the first session are rejected by the target base station, or all QoS flows on a same bearer of the first session are accepted by the target base station. In a third case, some QoS flows on a same bearer of the first session are rejected by the target base station, or some QoS flows on a same bearer of the first session are accepted by the target base station.

Generally, data forwarding between the base stations may be performed at a bearer granularity, and one or more QoS flows may be mapped to a same bearer for data transmission. In the first two cases, the base stations may perform data forwarding in a common manner. However, in the third case, some QoS flows on a same bearer are not accepted by the target base station, and therefore resources are wasted if a data packet corresponding to a rejected QoS flow is transmitted.

Specifically, in the first case, when all QoS flows in the first session are rejected by the target base station, the source base station and the target base station may transfer no data of the first session. When all QoS flows in the first session are accepted, the source base station and the target base station may transfer data of the entire first session. In the second case, when all QoS flows corresponding to a same bearer of the first session are rejected by the target base station, the source base station and the target base station may transfer no data corresponding to the bearer. When all QoS flows corresponding to a same bearer of the first session are transferred, the source base station and the target base station may forward data of the entire bearer. In the third case, because some QoS flows on a same bearer are not accepted by the target base station, resources are wasted if data of the entire bearer is forwarded. Moreover, if the target base station in an overloaded state rejects a QoS flow, air interface transmission becomes more congested if data of the entire bearer is forwarded.

For the plurality of cases, this embodiment of this application proposes a plurality of data forwarding solutions. A solution of data forwarding in this application is described below by combining uplink data transmission (UL) and downlink data transmission (DL).

In the DL process, the source base station mainly buffers two types of data. The first type of data is a new data packet that is received from the core network and that has not been sent to a terminal. Before receiving an end marker (end marker) sent by the core network, the source base station keeps receiving and buffering such data packets. The second type of data is a data packet that is being transmitted by the source base station to the terminal device by using a first bearer of the first session and that has not been acknowledged. The data packets may be PDCP SDUs being transmitted in the PDCP layer. The data packets that have not been acknowledged may be PDCP SDUs for which acknowledgements have not been received from an RLC layer of a base station.

In a UL process, the source base station further buffers a third type of data. The third type of data is out-of-order data packets received by the source base station from the terminal device, that is, serial numbers of the data packets are nonconsecutive. The source base station needs to submit data packets to an upper layer in sequence. Therefore, for data packets with nonconsecutive serial numbers, the source base station needs to temporarily buffer the data packets, and submit the data packets in sequence to the upper layer till all the remaining data packets are received. The data packets may be PDCP SDUs, and the upper layer may be a protocol layer above the PDCP layer. For example, the upper layer may be an SDAP layer or an RRC layer. In addition, in the UL process, the terminal device further buffers a fourth type of data. The fourth type of data is a data packet that is being transmitted by the terminal device to the source base station by using the first bearer of the first session and that has not been acknowledged. The data packets may be PDCP SDUs being transmitted in the PDCP layer. The data packets that have not been acknowledged may be PDCP SDUs for which acknowledgements have not been received from an RLC layer of the terminal device.

For the two types of data in a DL, the first type of data is transmitted based on a QoS flow and has not been mapped to a bearer. Therefore, for any of the three cases, if the QoS flow corresponding to the first type of data is rejected, the source base station does not transmit the first type of data to the target base station. If the QoS flow corresponding to the first type of data is accepted, the source base station transmits the first type of data to the target base station. The first type of data may be first data below.

In some embodiments, the method 200 further includes: sending, by the source base station, the first data to the target base station, where the first data is data that is received by the source base station from the core network and that corresponds to the first QoS flow in the first session.

In the method 200, for a manner of transmitting the first data, the source base station may transmit the first data to the target base station by using two solutions. In the first solution, the source base station transmits the first data to the target base station in the PDCP layer by using data packets corresponding to the first QoS flow. In the second solution, the source base station no longer serves data packets corresponding to the first QoS flow, but sends the first data to the target base station through a session tunnel. The session tunnel may be a session granularity tunnel. A format of a data packet of the session tunnel may be the same as a format of a data packet transmitted by the core network to the source base station. Therefore, after obtaining the first data from the core network and updating a frame header or updating a frame header and an extension frame header, the source base station may directly send the first data to the target base station in an SDAP layer, so that resources for processing the first data are reduced, thereby improving communication efficiency.

In this embodiment of this application, the first data sent by the core network to the terminal device is forwarded through the session tunnel between the source base station and the target base station, and it is not necessary to transmit the first data in the PDCP layer, so that time and resources for processing the first data are reduced, thereby improving communication efficiency.

For example, a format of the foregoing session tunnel may include: a general packet radio service tunneling protocol (General Packet Radio Service tunneling protocol, GTP) (header) header, an extension header (extension header), and an Internet Protocol packet (internal protocol packet, IP packet).

More specifically, a QFI identifier and/or a reflective QoS indication (reflective QoS indication, RQI) identifier may be added to a GTP extension header (extension header). A specific implementation of the GTP header is shown in the following Table 8. As shown in Table 8:

TABLE 8

| Extension header identifier | Extension header type |
|---|---|
| 1100 0100 | RQI |
| 1100 0011 | QFI |
| ... | ... |

In the method 200, for the second type of data in a DL and the third type of data in a UL, the source base station may transmit the second type and/or third type of data to the target base station in two manners. In a first manner, the source base station may transmit the second type and/or third type of data to the target base station at a bearer granularity. Alternatively, the source base station transmits data packets corresponding to all QoS flows on one bearer to the target base station. In a second manner, the source base station may transmit the second type and/or third type of data to the target base station at a QoS flow granularity. Alternatively, the source base station transmits data packets corresponding to the accepted first QoS flow to the target base station. Both the first manner and the second manner may be applied to the foregoing three cases of handover from the source base station to the target base station.

With reference to the first manner, when the second type of data is first PDCP SDUs below, the method 200 further includes: sending, by the source base station, the first PDCP SDUs to the target base station, where the first PDCP SDUs include PDCP SDUs of a first bearer of the first session, and the first bearer is a bearer between the terminal device and the source base station.

The first PDCP SDUs may include the second type of data in a DL or the third type of data in a UL. For example, for the DL process, the first PDCP SDUs may include PDCP SDUs that are sent by the source base station to the terminal device by using the first bearer of the first session and that have not been acknowledged, and/or for the UL process, the first PDCP SDUs further include out-of-order PDCP SDUs that are received by the source base station from the terminal device by using the first bearer of the first session.

The accepted QoS flow may be the first QoS flow, and the rejected QoS flow may be the second QoS flow. The second QoS flow may be a QoS flow that is on the first bearer and that is not accepted by the target base station.

A QoS flow corresponding to the first PDCP SDUs may include all QoS flows corresponding to the first bearer. Alternatively, the first PDCP SDUs may include PDCP SDUs corresponding to the first QoS flow and the second QoS flow. It may be further understood that the source base station does not differentiate between the first PDCP SDUs included in the first bearer based on the first QoS flow and the second QoS flow, but sends all the PDCP SDUs included in the first bearer to the target base station.

With reference to the first manner, in some embodiments, the target base station can recognize that a PDCP SDU corresponds to a specific QoS flow. For example, an extension header of a PDCP SDU may include an identifier of a QoS flow corresponding to the PDCP SDU. The target base station may read the identifier of the QoS flow from the extension header of the PDCP SDU, and determine whether the first PDCP SDUs correspond to an accepted QoS flow or a rejected QoS flow. Further, third PDCP SDUs are determined from the first PDCP SDUs, and the third PDCP SDUs are PDCP SDUs that are in the first PDCP SDUs and that correspond to a transferred QoS flow.

With reference to the first manner, in some other embodiments, the target base station cannot independently recognize a QoS flow corresponding to a PDCP SDU. Therefore, in this case, the method 200 further includes: sending, by the source base station, seventh information to the target base station, where the seventh information is used to indicate that the first PDCP SDUs belong to an accepted QoS flow and/or a rejected QoS flow.

Optionally, the accepted QoS flow and/or rejected QoS flow may also be described as a transferred QoS flow and/or an untransferred QoS flow.

For example, the seventh information may include a serial number (serial number, SN) of an accepted QoS flow or a serial number of a rejected QoS flow.

Optionally, the seventh information may be carried in a serial number status transfer message and a serial number accept status (SN status transfer & SN accept status) message. The SN status transfer message and the SN accept status message may be transmitted through a communications interface between the source base station and the target base station. In some embodiments, the communications interface may be an Xn interface.

The SN status transfer message and the SN accept status message may be used to indicate a serial number (serial number, SN) of an accepted QoS flow or a serial number of a rejected QoS flow.

Optionally, the seventh information may be carried in another type of message. This is not limited in this embodiment of this application.

With reference to the first manner, after the target base station receives the first PDUCP SDUs from the source base station, the method 200 further includes: determining, by the target base station, third PDCP SDUs based on the seventh information, where the third PDCP SDUs are PDCP SDUs that are in the first PDCP SDUs and that correspond to a transferred QoS flow; and transmitting, by the target base station, the third PDCP SDUs to the upper layer, and/or sending, by the target base station, the third PDCP SDUs to the terminal device.

The transferred QoS flow may be a QoS flow transferred to the target base station. In the method 200, the transferred QoS flow may be the first QoS flow.

Optionally, the third PDCP SDUs may be determined based on the seventh information. In some other embodiments, the target base station may independently recognize, based on QFIs included in extension headers of the first PDCP SDUs instead of the seventh information, QoS flows corresponding to the first PDCP SDUs, to determine the third PDCP SDUs from the first PDCP SDUs.

It may be learned based on the foregoing description that the first PDCP SDUs include at least one of the two types of data. The two types of data are respectively used in a UL and a DL. Specifically, for the DL process, the first PDCP SDUs may include PDCP SDUs that are sent by the source base station to the terminal device by using the first bearer of the first session and that have not been acknowledged, and/or for the UL process, the first PDCP SDUs further include out-of-order PDCP SDUs that are received by the source base station from the terminal device by using the first bearer of the first session. Therefore, the third PDCP SDUs may also include at least one of the two types of data. After obtaining the third PDCP SDUs, the target base station may send, to the terminal device by using the second bearer, PDCP SDUs used for a DL in the third PDCP SDUs, and may then transmit data used for a UL in the third PDCP SDUs to the upper layer. The upper layer may be a protocol layer above the PDCP layer of a base station. For example, the upper layer may be an SDAP layer or an RRC layer.

With reference to the second manner, the method 200 further includes: receiving, by the target base station, second PDCP SDUs from the source base station, where the second PDCP SDUs include PDCP SDUs that are sent by the source base station to the terminal device by using the first bearer of the first session and that are not acknowledged, and/or the second PDCP SDUs include out-of-order PDCP SDUs that are received by the source base station from the terminal device by using the first bearer of the first session, and the second PDCP SDUs correspond to the first QoS flow in the first bearer.

In this embodiment of this application, after a QoS flow is rejected by the target base station, the source base station does not forward data corresponding to the rejected QoS flow to the target base station, and forwards only data corresponding to an accepted QoS flow. Therefore, overheads for data transmission between the base stations are reduced.

In some embodiments, the method 200 further includes: transmitting, by the target base station, the second PDCP SDUs to the terminal device, and/or transmitting, by the target base station, the second PDCP SDUs to the upper layer.

In this embodiment of this application, after a QoS flow is rejected by the target base station, in the base station handover process, the target base station and the terminal device do not transmit data corresponding to the rejected QoS flow, and transmit only data corresponding to an accepted QoS flow. Therefore, overheads of air interface resources are reduced, so that saved resources may be used for transmitting other data, thereby improving system spectral efficiency.

It may be known based on the foregoing description that the second PDCP SDUs include at least one of the two types of data. The two types of data are respectively used in a UL and a DL. For example, for the DL process, the second PDCP SDUs may include PDCP SDUs that are sent by the source base station to the terminal device by using the first bearer of the first session and that have not been acknowledged, and/or for the UL process, the second PDCP SDUs further include out-of-order PDCP SDUs that are received by the source base station from the terminal device by using the first bearer of the first session. Therefore, after obtaining the second PDCP SDUs, the target base station may send, to the terminal device by using the second bearer, PDCP SDUs used for a DL of the second PDCP SDUs, and may then transmit data used for a UL of the second PDCP SDUs to the upper layer. The upper layer may be a protocol layer above the PDCP layer of the base station. For example, the upper layer may be an SDAP layer or an RRC layer.

In some embodiments, the method 200 further includes: sending, by the source base station, eighth information to the terminal device, where the eighth information is used to indicate serial numbers of the second PDCP SDUs.

If the transferred first QoS flow and the untransferred second QoS flow exist in the first bearer between the terminal device and the source base station, serial numbers of the PDCP SDUs in the first bearer include serial numbers of PDCP SDUs corresponding to the first QoS flow and the second QoS flow, and the serial numbers of the PDCP SDUs corresponding to the first QoS flow and the serial numbers of the PDCP SDUs corresponding to the second QoS flow may be alternately arranged. Therefore, the serial numbers of the second PDCP SDUs may be nonconsecutive. Generally, after receiving the PDCP SDUs, the terminal device or the base station needs to transfer the PDCP SDUs to an upper layer in sequence based on the serial numbers. However, data corresponding to the second QoS flow is not transmitted between the terminal device and the target base station. Therefore, after receiving the eighth information, the terminal device may recognize the second PDCP SDUs, so that even if the serial numbers of the second PDCP SDUs are nonconsecutive, the terminal device may transmit the second PDCP SDUs to the upper layer without waiting for the data corresponding to the second QoS flow, thereby improving communication efficiency and improving flexibility of transmission management in the base station handover process.

It is further mentioned above that for a UL process, the terminal device further has a fourth type of data. The fourth type of data is a data packet that is being transmitted by the terminal device to the source base station and that has not been acknowledged.

The method 200 further includes: receiving, by the target base station, fourth PDCP SDUs from the terminal device, where the fourth PDCP SDUs include PDCP SDUs that are sent by the terminal device to the source base station by using the first bearer of the first session and that have not been acknowledged, and the fourth PDCP SDUs correspond to the first QoS flow in the first bearer.

For example, after receiving the fifth information, the terminal device determines the first QoS flow accepted by the target base station. Further, the terminal device may not send PDCP SDUs corresponding to the rejected second QoS flow to the target base station, but sends fourth PDCP SDUs corresponding to the accepted first QoS flow to the target base station.

In this embodiment of this application, in the base station handover process, the terminal device does not need to send PDCP SDUs corresponding to a rejected QoS flow to the target base station, and only needs to send PDCP SDUs corresponding to the accepted first QoS flow to the target base station, so that air interface resources are saved, and the saved resources may be used for transmitting other data, thereby improving system spectral efficiency.

In some embodiments, the method 200 further includes: receiving, by the target base station, ninth information from the terminal device, the ninth information is used to indicate serial numbers of the fourth PDCP SDUs; and transmitting, by the target base station, the fourth PDCP SDUs to the upper layer based on the ninth information.

The fourth PDCP SDUs are PDCP SDUs corresponding to the first QoS flow. In the base station handover process, the serial numbers of the fourth PDCP SDUs may be nonconsecutive. Generally, after receiving the PDCP SDUs, the terminal device or the base station needs to transfer the PDCP SDUs to the upper layer in sequence based on the serial numbers. However, data corresponding to the second QoS flow is not transmitted between the terminal device and the target base station. Therefore, after receiving the ninth information, the target base station may recognize the fourth PDCP SDUs, so that even if the serial numbers of the fourth PDCP SDUs are nonconsecutive, the target base station may transmit the fourth PDCP SDUs to the upper layer and does not need to wait for PDCP SDUs corresponding to the second QoS flow, thereby improving communication efficiency and improving flexibility of transmission management in the base station handover process.

In this embodiment of this application, the terminal device sends the ninth information to the target base station to indicate the serial numbers of the fourth PDCP SDUs, so that the target base station may recognize fourth PDCP SDUs corresponding to an accepted QoS flow, does not need to wait for other PDCP SDUs, and does not need to submit the fourth PDCP SDUs in sequence, thereby improving communication efficiency and improving flexibility of transmission management in the base station handover process.

Figure 3:
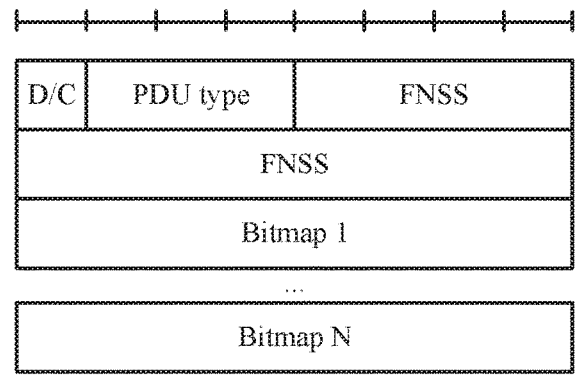
FIG. 3 is a schematic diagram of a format of a protocol data unit according to an embodiment of this application.

Optionally, FIG. 3 shows a format of a protocol data unit (protocol data unit, PDU) of the PDCP layer in this embodiment of this application. The PDU may be used as a control PDU transmitted by the base station and the terminal device.

As shown in FIG. 3, a PDU type (PDU type) may be used to indicate a content type indicated by the PDU. For example, when the PDU type is set to 100, it may indicate that the PDU is used to indicate a serial number of a PDCP SDU. When the PDU type is set to another value, the PDU may be used to indicate another type of information. For example, in an example, Table 6 shows the content type indicated by the PDU when the PDU type has another value. It should be noted that a value assigned to a PDU type in Table 6 is merely a specific example. A person skilled in the art may understand that content indicated by a value assigned to a PDU type may be defined based on an actual case, but is not limited to the examples in this application. Similarly, the value assignment manner is also applicable to similar cases in other embodiments of this application.

TABLE 9

| PDU type | |
| --- | --- |
| bit | Description |
| 000 | PDCP status report (PDCP status report) |
| 100 | SN indication control PDU (SN indication control PDU) |

In addition, first non-sending serial numbers (first not sending SN, FNSS) in FIG. 3 may be serial numbers of first PDCP SDUs of PDCP SDUs that are not sent. The PDCP SDUs that are not sent may be PDCP SDUs corresponding to a rejected QoS flow.

In another implementation, the FNSSs may be replaced with first sending serial numbers (first sending SN, FSS). The FSSs may be serial numbers of first PDCP SDUs of PDCP SDUs that are sent. The PDCP SDUs that are sent may be PDCP SDUs corresponding to an accepted QoS flow:

D/C in FIG. 3 may be used to indicate an application type of the PDU. For example, when D/C is set to 0, it may indicate that the PDU is a control PDU. When D/C is set to 1, it may indicate that the PDU is a data PDU.

Optionally, a bitmap (bitmap) is further included in FIG. 3. The bitmap may be combined with the FNSSs or the FSSs to indicate whether a PDCP SDU corresponding to the FNSSs or the FSSs is a PDCP SDU that is sent or a PDCP SDU that is not sent. For example, when 1 is assigned to the bitmap, the PDCP SDU may be a PDCP SDU that is sent. When 0 is assigned to the bitmap, the PDCP SDU may be a PDCP SDU that is not sent.

The source base station and the target base station directly transmit information to each other in the example in FIG. 2. It should be noted that the method in FIG. 2 is also applicable to base station handover through a core network. A signaling exchange process of base station handover through the core network is described below.

Figure 4:
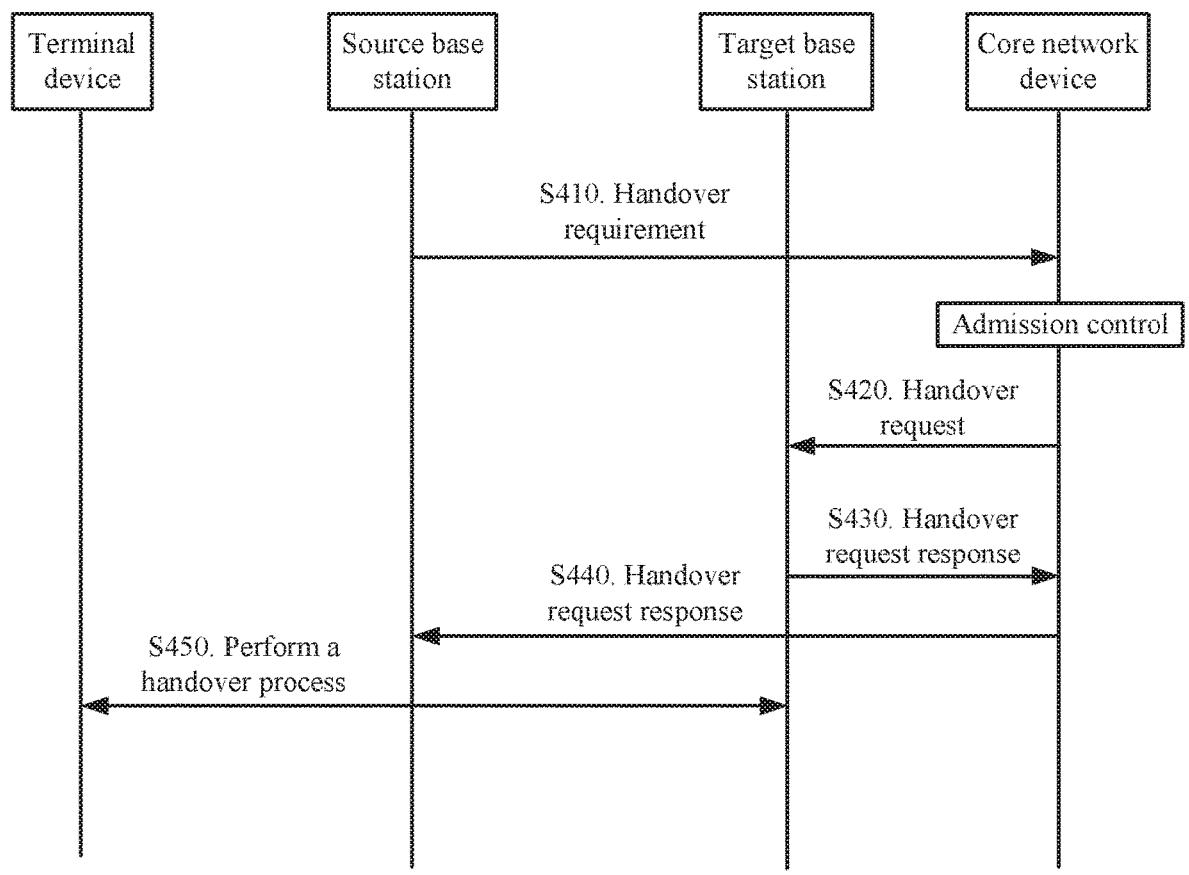
FIG. 4 is a schematic flowchart of a base station handover process according to an embodiment of this application.

FIG. 4 shows a signaling exchange process of a base station handover through a core network. A core network device in FIG. 4 may be, for example, an AMF. In the method in FIG. 4, the source base station and the target base station do not directly transmit information to each other, but exchange information by using the core network device. Content in the example in FIG. 4 that is the same as or similar to that in FIG. 2 is not described herein again. The method in FIG. 4 includes the following steps.

S410. The source base station sends a handover requirement message to the core network device.

S420. The core network device sends a handover request message to the target base station based on the handover requirement message.

S430. The target base station performs admission control after receiving a handover request response message, and sends the handover request response message to the core network device.

Specifically, for content of admission control, refer to step S220 in FIG. 2.

S440. The core network device sends the handover request response message to the source base station.

S450. A terminal device performs a handover process.

Figure 5:
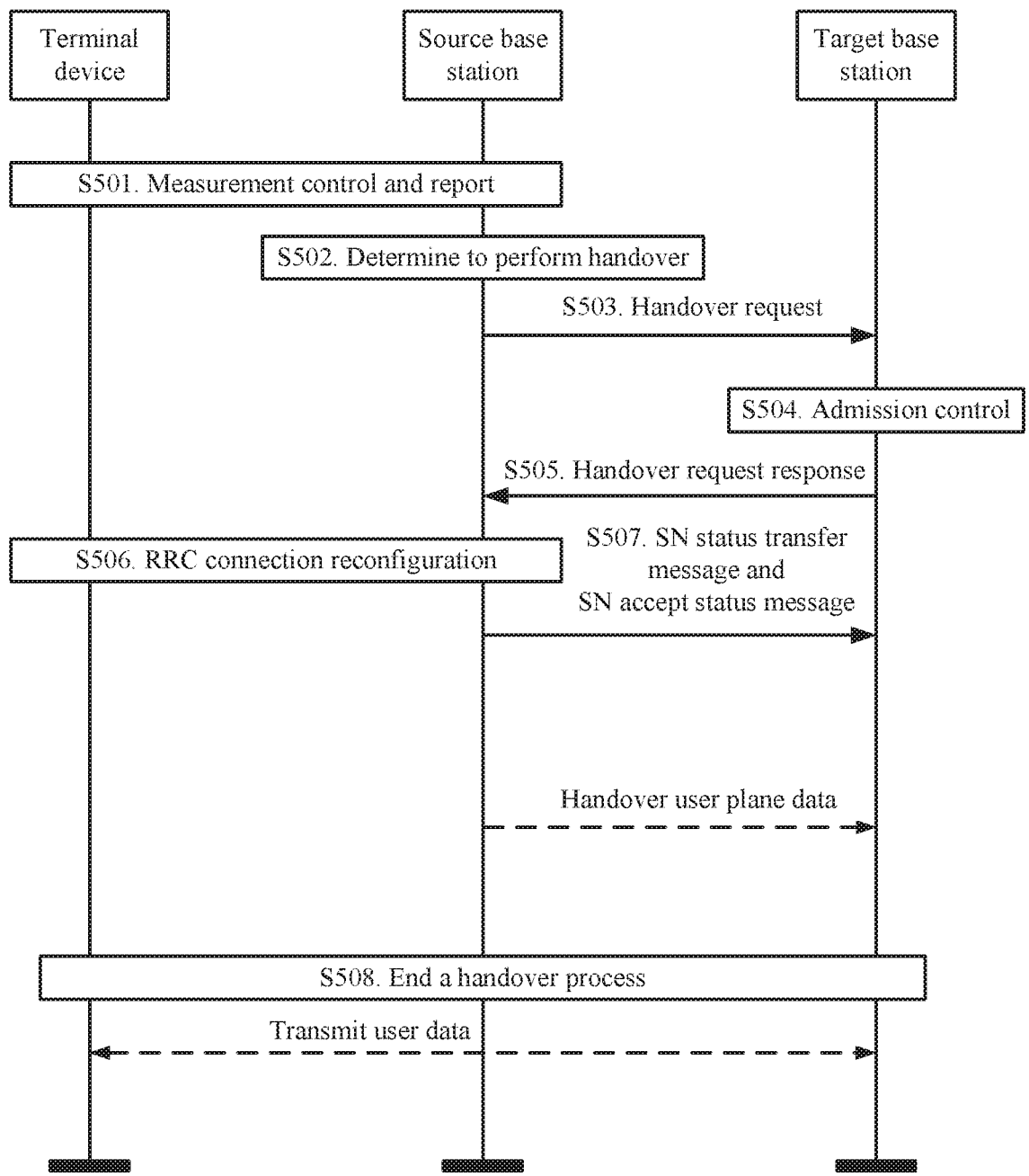
FIG. 5 is a schematic diagram of a communication method according to another embodiment of this application.

FIG. 5 is a schematic diagram of a communication method 500 according to an embodiment of this application. FIG. 5 shows a specific procedure of base station handover. For content in the example in FIG. 5 that is the same as or similar to that in FIG. 2, refer to related embodiments in FIG. 2, and details are not described herein again. As shown in FIG. 5, the method in FIG. 5 includes the following steps.

S501. The terminal device reports a measurement result to a source base station.

S502. The source base station determines to hand over the terminal device to the target base station.

For example, based on the measurement result reported by the terminal device, the source base station determines to hand over the terminal device to one target base station.

S503. The source base station sends a handover request message to the target base station, where the handover request message may include a QoS flow message of a session corresponding to the terminal device. For specific content of the handover request message, refer to related description in the example in FIG. 2.

S504. The target base station performs QoS flow granularity admission control.

Specifically, for content of admission control, refer to step S220 in FIG. 2.

S505. The target base station sends a handover response message to the source base station.

Specifically, for content of the handover response message, refer to step S230 in FIG. 2.

S506. The source base station sends an RRC reconfiguration message to the terminal device, where the RRC reconfiguration message includes an admission control result.

Specifically, the first RRC message in FIG. 2 may be the foregoing RRC reconfiguration message. For the RRC reconfiguration message, refer to related description of step S230 in FIG. 2.

For example, the RRC reconfiguration message may include sending a mapping from an accepted QoS flow to a DRB to the terminal device.

S507. The source base station sends an SN status transfer message and an SN accept status message to the target base station, and simultaneously starts a data forwarding process.

For related content of the SN status transfer message and the SN accept status message and data forwarding, refer to the description of the example in FIG. 2.

S508. Synchronize the terminal device to the target base station to eventually end a handover process.

For example, for a DL, the target base station may send a PDCP control PDU in FIG. 3 to the terminal device to notify the terminal device of an SN status.

For example, for a UL, the terminal device may send a PDCP control PDU in FIG. 3 to the target base station to notify the target base station of an SN status.

The communication method in this embodiment of this application is described above in detail with reference to FIG. 1 to FIG. 5. The base stations and the terminal device in this embodiment of this application are described below in detail with reference to FIG. 6 to FIG. 11.

Figure 6:
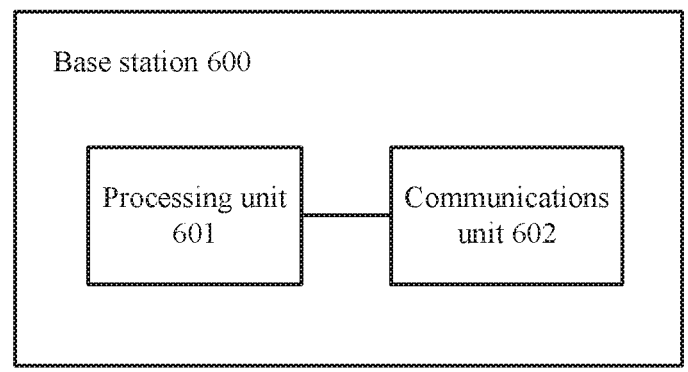
FIG. 6 is a schematic structural diagram of a base station according to an embodiment of this application.

FIG. 6 is a schematic block diagram of a base station 600 according to an embodiment of this application. It should be understood that the base station 600 can perform the steps performed by the source base station in the methods in FIG. 1 to FIG. 5. To avoid repetition, details are not described herein again. The base station 600 includes a processing unit 601 and a communications unit 602.

The processing unit 601 is configured to: send a handover request message to a target base station by using the communications unit 602, where the handover request message is used to instruct to hand over a first session of a terminal device from the source base station to the target base station, the handover request message includes first information, the first information includes information about at least one quality of service QoS flow in the first session, and the first session is a session corresponding to the terminal device; and receive a handover request response message from the target base station by using the communications unit 602, where the handover request response message includes second information, the second information is used to indicate that the target base station accepts a first QoS flow in the first session, and the at least one QoS flow includes the first QoS flow.

Figure 7:
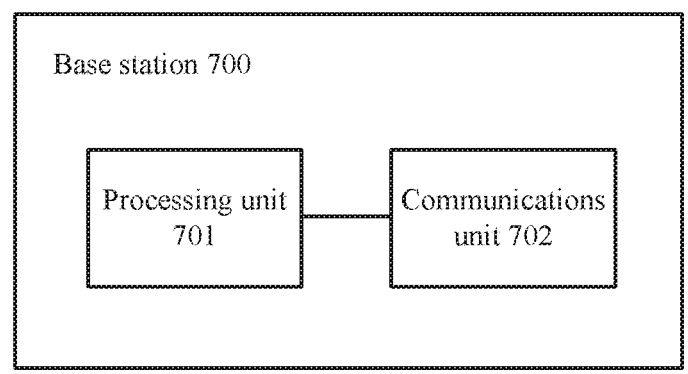
FIG. 7 is a schematic structural diagram of a base station according to another embodiment of this application.

FIG. 7 is a schematic block diagram of a base station 700 according to an embodiment of this application. It should be understood that the base station 700 can perform the steps performed by the target base station in the methods in FIG. 1 to FIG. 5. To avoid repetition, details are not described herein again. The base station 700 includes a processing unit 701 and a communications unit 702.

The processing unit 701 is configured to: receive a handover request message from a source base station by using the communications unit 702, where the handover request message is used to instruct to hand over a terminal device from the source base station to the target base station, the handover request message includes first information, the first information includes information about at least one quality of service QoS flow in a first session, and the first session is a session corresponding to the terminal device; and send a handover request response message to the source base station by using the communications unit 702, where the handover request response message includes second information, the second information is used to indicate that the target base station accepts a first QoS flow in the first session, and the at least one QoS flow includes the first QoS flow.

Figure 8:
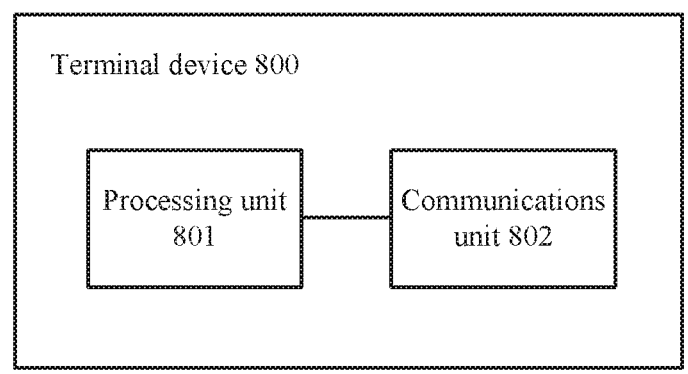
FIG. 8 is a schematic structural diagram of a terminal device according to an embodiment of this application.

FIG. 8 is a schematic block diagram of a terminal device 800 according to an embodiment of this application. It should be understood that the terminal device 800 can perform the steps performed by the terminal device in the methods in FIG. 1 to FIG. 5. To avoid repetition, details are not described herein again. The terminal device 800 includes a processing unit 801 and a communications unit 802.

The processing unit 801 is configured to: receive a first RRC message from a source base station by using the communications unit 802, where the first RRC message is used to instruct the terminal device to hand over from the source base station to the target base station, the first RRC message includes fifth information, and the fifth information is used to indicate that the target base station accepts a first QoS flow in a first session; and send a first RRC response message to the target base station by using the communications unit 802, the first RRC response message is used to respond to the first RRC message.

Figure 9:
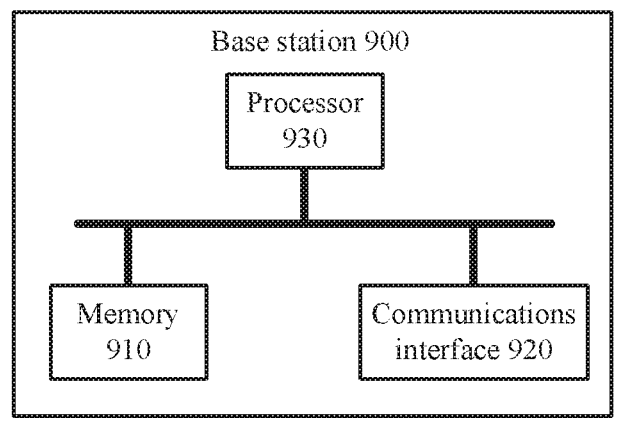
FIG. 9 is a schematic structural diagram of a base station according to another embodiment of this application.

FIG. 9 is a schematic block diagram of a base station 900 according to an embodiment of this application. It should be understood that the base station 900 can perform the steps performed by the source base station in the methods in FIG. 1 to FIG. 5. To avoid repetition, details are not described herein again. The base station 900 includes: a memory 910, configured to store a program;

a communications interface 920, configured to communicate with another device; and a processor 930, configured to execute the program in the memory 910, where when the program is executed, the processor 930 is configured to: send a handover request message to a target base station through the communications interface 920, where the handover request message is used to instruct to hand over a first session of a terminal device from the source base station to the target base station, the handover request message includes first information, the first information includes information about at least one quality of service QoS flow in the first session, and the first session is a session corresponding to the terminal device; and receive a handover request response message from the target base station through the communications interface 920, where the handover request response message includes second information, the second information is used to indicate that the target base station accepts a first QoS flow in the first session, and the at least one QoS flow includes the first QoS flow.

Figure 10:
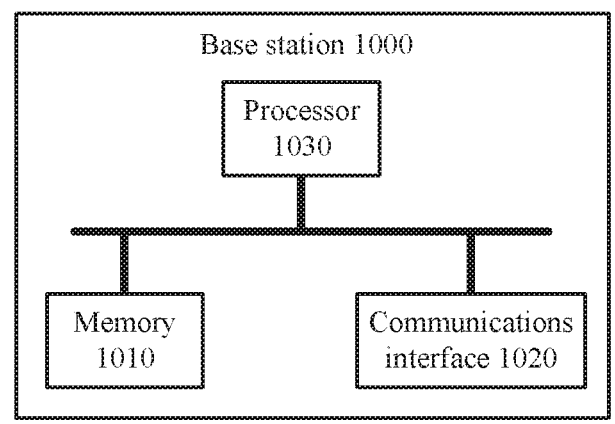
FIG. 10 is a schematic structural diagram of a base station according to another embodiment of this application.

FIG. 10 is a schematic block diagram of a base station 1000 according to an embodiment of this application. It should be understood that the base station 1000 can perform the steps performed by the target base station in the methods in FIG. 1 to FIG. 5. To avoid repetition, details are not described herein again. The base station 1000 includes:

a memory 1010, configured to store a program;

a communications interface 1020, configured to communicate with another device; and a processor 1030, configured to execute the program in the memory 1010, where when the program is executed, the processor 1030 is configured to: receive a handover request message from a source base station through the communications interface 1020, where the handover request message is used to instruct to hand over a terminal device from the source base station to the target base station, the handover request message includes first information, the first information includes information about at least one quality of service QoS flow in a first session, and the first session is a session corresponding to the terminal device; and send a handover request response message to the source base station through the communications interface 1020, where the handover request response message includes second information, the second information is used to indicate that the target base station accepts a first QoS flow in the first session, and the at least one QoS flow includes the first QoS flow.

Figure 11:
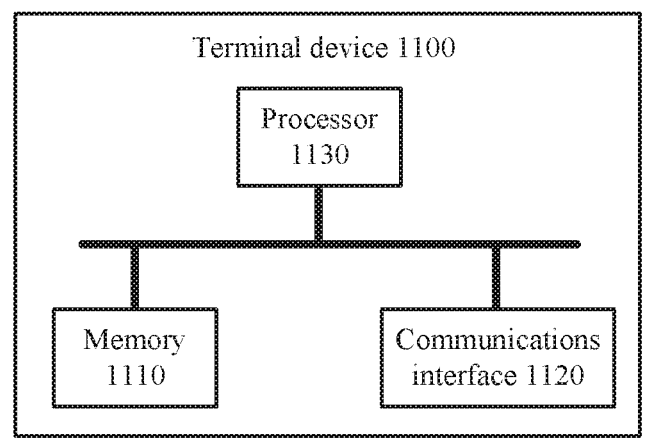
FIG. 11 is a schematic structural diagram of a terminal device according to another embodiment of this application.

FIG. 11 is a schematic block diagram of a terminal device 1100 according to an embodiment of this application. It should be understood that the terminal device 1100 can perform the steps performed by the terminal device in the methods in FIG. 1 to FIG. 5. To avoid repetition, details are not described herein again. The terminal device 1100 includes:

a memory 1110, configured to store a program;

a communications interface 1120, configured to communicate with another device; and a processor 1130, configured to execute the program in the memory 1110, where when the program is executed, the processor 1130 is configured to: receive a first radio resource control RRC message from a source base station through the communications interface 1120, where the first RRC message is used to instruct the terminal device to hand over from the source base station to a target base station, the first RRC message includes fifth information, and the fifth information is used to indicate that the target base station accepts a first QoS flow in a first session; and send a first RRC response message to the target base station through the communications interface 1120, where the first RRC response message is used to respond to the first RRC message.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   sending, by a source base station, packet data convergence protocol (PDCP) service data units (SDUs) to a terminal device using a first bearer of a first session, wherein the first session is a session corresponding to the terminal device;
   sending, by the source base station, a handover request message to a target base station, wherein the handover request message is used to instruct to hand over the first session of the terminal device from the source base station to the target base station, wherein the handover request message comprises first information, wherein the first information comprises information about at least two quality of service (QoS) flows in the first session;
   receiving, by the source base station, a handover request response message from the target base station, wherein the handover request response message comprises second information, wherein the second information is used to indicate that the target base station accepts a first QoS flow in the first session, and wherein the at least two QoS flows comprises the first QoS flow;
   receiving, by the source base station, third information and fourth information from the target base station, wherein the third information is used to indicate that the target base station rejects a second QoS flow in the first session, the fourth information is used to indicate a reason why the second QoS flow is rejected, and wherein the at least two QoS flows comprises the second QoS flow;
   in response to receiving the handover request response message, sending, by the source base station, a radio resource control (RRC) connection reconfiguration message to the terminal device, wherein the RRC connection reconfiguration message comprises instruction information instructing the terminal device to establish a second bearer of the first session between the terminal device and the target base station;
   receiving, by the source base station, sixth information from the target base station, wherein the sixth information is used to indicate a mapping relationship between the first QoS flow and the second bearer of the first session, and wherein the second bearer is a bearer between the terminal device and the target base station; and
   sending, by the source base station, the sixth information to the terminal device.

2. The communication method according to claim 1, wherein the reason why the second QoS flow is rejected comprises at least one of the following: no resource is available, QoS flow information is not supported, QoS flow information is invalid, or 5G QoS identifier (5QI) information is invalid.

3. The communication method according to claim 1, further comprising:
   sending, by the source base station, fifth information to the terminal device, wherein the fifth information is used to indicate that the target base station accepts the first QoS flow in the first session.

4. The communication method according to claim 3, wherein the fifth information is carried in a first radio resource control (RRC) message, and wherein the first RRC message is used to instruct the terminal device to hand over from the source base station to the target base station.

5. The communication method according to claim 1, further comprising:
   sending, by the source base station, first data to the target base station, wherein the first data is data that is received by the source base station from a core network and that corresponds to the first QoS flow in the first session.

6. The communication method according to claim 5, wherein the sending, by the source base station, first data to the target base station comprises:
   sending, by the source base station, the first data to the target base station through a session tunnel.

7. A communication method, comprising:
   receiving, by a terminal device, packet data convergence protocol (PDCP) service data units (SDUs) from a source base station using a first bearer of a first session, wherein the first session is a session corresponding to the terminal device;
   receiving, by the terminal device, a first radio resource control (RRC) message from the source base station, wherein the first RRC message is used to instruct the terminal device to hand over from the source base station to a target base station, wherein the first RRC message comprises instruction information instructing the terminal device to establish a second bearer of the first session between the terminal device and the target base station, wherein the first RRC message comprises fifth information, wherein the fifth information is used to indicate that the target base station accepts a first quality of service (QoS) flow in the first session, wherein the source base station receives third information and fourth information from the target station, and wherein the third information is used to indicate that the target base station rejects a second QoS flow in the first session, and the fourth information is used to indicate a reason why the second QoS flow is rejected;

receiving, by the terminal device, sixth information from the source base station, wherein the sixth information is used to indicate a mapping relationship between the first QoS flow and the second bearer of the first session, and wherein the second bearer is a bearer between the terminal device and the target base station; and sending, by the terminal device, a first RRC response message to the target base station, wherein the first RRC response message is used to respond to the first RRC message.

8. A base station, wherein the base station is a source base station, and wherein the base station comprises:

a communications interface;

a memory, configured to store instructions; and at least one processor, connected to the memory and the communications interface, wherein the instructions, when executed by the at least one processor, instruct the at least one processor to perform the following steps:

sending packet data convergence protocol (PDCP) service data units (SDUs) to a terminal device using a first bearer of a first session, wherein the first session is a session corresponding to the terminal device;

sending a handover request message to a target base station through the communications interface, wherein the handover request message is used to instruct to hand over the first session of the terminal device from the source base station to the target base station, wherein the handover request message comprises first information, wherein the first information comprises information about at least two quality of service (QoS) flows in the first session;

receiving a handover request response message from the target base station through the communications interface, wherein the handover request response message comprises second information, wherein the second information is used to indicate that the target base station accepts a first QoS flow in the first session, and wherein the at least two QoS flows comprises the first QoS flow;

receiving third information and fourth information from the target base station, wherein the third information is used to indicate that the target base station rejects a second QoS flow in the first session, the fourth information is used to indicate a reason why the second QoS flow is rejected, and wherein the at least two QoS flows comprises the second QoS flow;

in response to receiving the handover request response message, sending a radio resource control (RRC) connection reconfiguration message to the terminal device, wherein the RRC connection reconfiguration message comprises instruction information instructing the terminal device to establish a second bearer of the first session between the terminal device and the target base station;

receiving sixth information from the target base station through the communications interface, wherein the sixth information is used to indicate a mapping relationship between the first QoS flow and the second bearer of the first session, and wherein the second bearer is a bearer between the terminal device and the target base station; and sending the sixth information to the terminal device.

9. The base station according to claim 8, wherein the reason why the second QoS flow is rejected comprises at least one of the following: no resource is available, QoS flow information is not supported, QoS flow information is invalid, or QoS flow information is invalid.

10. The base station according to claim 8, wherein the instructions further instruct the at least one processor to send fifth information to the terminal device through the communications interface, wherein the fifth information is used to indicate that the target base station accepts the first QoS flow in the first session.

11. The base station according to claim 10, wherein the fifth information is carried in a first radio resource control (RRC) message, and wherein the first RRC message is used to instruct the terminal device to hand over from the source base station to the target base station.

12. A terminal device, comprising:

a communications interface;

a memory, configured to store instructions; and at least one processor, connected to the memory and the communications interface, wherein the instructions, when executed by the at least one processor, instruct the at least one processor to perform the following steps:

receiving packet data convergence protocol (PDCP) service data units (SDUs) from a source base station using a first bearer of a first session, wherein the first session is a session corresponding to the terminal device;

receiving a first radio resource control (RRC) message from the source base station through the communications interface, wherein the first RRC message is used to instruct the terminal device to hand over from the source base station to a target base station, wherein the first RRC message comprises instruction information instructing the terminal device to establish a second bearer of the first session between the terminal device and the target base station, wherein the first RRC message comprises fifth information, and wherein the fifth information is used to indicate that the target base station accepts a first quality of service (QoS) flow in the first session, wherein the source base station receives third information and fourth information from the target station, and wherein the third information is used to indicate that the target base station rejects a second QoS flow in the first session, and the fourth information is used to indicate a reason why the second QoS flow is rejected;

receiving sixth information from the source base station through the communications interface, wherein the sixth information is used to indicate a mapping relationship between the first QoS flow and the second bearer of the first session, and wherein the second bearer is a bearer between the terminal device and the target base station; and sending a first RRC response message to the target base station through the communications interface, wherein the first RRC response message is used to respond to the first RRC message.

* * * * *